Patented Dec. 9, 1952

2,621,278

UNITED STATES PATENT OFFICE 2,621,278

ELECTRIC ARC WELDING

Albert Muller, Plainfield, N. J., assignor to Air Reduction Company, Incorporated, a corporation of New York No Drawing. Application June 21, 1950, Serial No. 169,541

4 Claims. (Cl. 219—10)

This invention relates to the electric arc welding of ferrous metals (such as certain types of steel) containing substantial quantities of carbon and oxygen, and particularly to the inert gas shielded electric arc welding of rimmed or semi-killed steels with a consumable bare ferrous wire electrode containing a material which is transferred across the arc during the welding operation to kill the molten metal in the weld pool. The present application is a continuation in part of my prior copending application Serial No. 39,372, filed July 17, 1948.

It is well known that in the welding of rimmed or semi-killed steels (steels which contain appreciable amounts of oxygen, usually present in the form of iron oxide) the carbon in the steel, having a strong affinity for oxygen, reduces the iron oxide to form iron and carbon monoxide. This reaction, called a "rimming" action, is initiated when the steel is heated and fused by the welding operation and the resultant evolution of carbon monoxide in the molten weld metal causes porosity in the weld due to entrapment of the gas in the molten metal upon solidification thereof. Also, some of the carbon is removed from the steel thus further weakening the weld.

Attempts have been made to solve this problem and to obtain sound welds in rimmed and semi-killed steels by the incorporation of special constituents in the filler wire used for gas welding. However, the added constituents frequently are oxidized or otherwise adversely affected by the gases of the torch flame, and by air from the atmosphere. Further, such proposed solutions have been of no use in connection with metallic arc welding because the special constituents in the filler wire have been oxidized in the electric arc and/or adversely interfere with the normal functioning of the arc itself, with resultant detrimental effect on the soundness of the weld. As a matter of fact, it has in the past been considered advisable to make the consumable electrode itself of a rimmed or semi-killed steel, in order to promote better arc transfer characteristics. The gas produced by the rimming action in the molten electrode tip is commonly believed to facilitate transfer of the filler metal from the consuming tip across the arc into the weld puddle. But though the arc might be benefited thereby, uncoated rimmed or semi-killed electrode filler wire does not make for a sound, non-porous weld. To obviate this difficulty coatings, fluxes and other means external to the consumable electrode itself have been tried. But such solutions have great disadvantages and are of little or no value when considered in connection with metallic arc welding utilizing bare or uncoated consumable wire electrodes.

According to the present invention I have found that ferrous metals such as rimmed and semi-killed steels containing carbon and large amounts of oxygen can be satisfactorily welded, with sound, fine grained, non-porous weld metal, by an inert gas shielded electric arc process utilizing a bare or uncoated consumable steel filler wire electrode composed principally of iron containing carbon, manganese, and silicon and also containing as an essential active ingredient relatively small amounts of a powerful deoxidizer such as elemental or uncombined aluminum. The filler wire itself is fully killed and possesses residual deoxidizing power which is provided by an excess of aluminum deoxidizer in predetermined amount over that used to deoxidize or kill the steel of the filler metal originally during manufacture thereof. Transfer of the residual deoxidizing aluminum in elemental form across the arc with the filler metal into the molten weld pool is accomplished without oxidation or substantial loss or change of the deoxidizer by shielding the arc with a continuous unbroken envelope or blanket of an inert monatomic gas such as argon and/or helium.

The deoxidizing element is preferably aluminum. Aluminum deoxidizes more efficiently than most other agents and a smaller amount of it is required for a given amount of oxygen. Further, it promotes a desirable fine grained structure in the finished weld. Such structure is tougher than a coarse-grained structure such for instance as is produced in a weld made with a steel filler wire containing iron, carbon, manganese and silicon but no aluminum.

The aluminum is added to the steel of the filler wire during its manufacture, either in the ladle, the ingot mold or both. A measured or controlled quantity of aluminum is added to the molten steel sufficient both to fully kill or deoxidize the steel and to provide an excess of aluminum such that the total aluminum content of the filler wire (including both combined and uncombined aluminum) ranges from .02% to .18% by weight. In practice this addition of aluminum to the molten steel in a predetermined quantity in excess of the quantity actually required to fully kill the steel provides sufficient residual or uncombined aluminum in the filler wire to prevent the rimming action that otherwise would occur in welding and enables sound welds to be produced in rimmed and semi-killed steels.

Best results are attained when the total aluminum content of the filler wire electrode is maintained at a value within the narrower range from about 0.04% to about 0.10%. In general, the residual or uncombined aluminum in the filler wire must be present as an essential active ingredient in sufficient quantity to combine with substantially all the iron oxide or oxygen in the weld pool. Larger quantities may also be used. However, the total aluminum present in the filler metal should not exceed .18% because cracking of the deposit might otherwise occur. Within the ranges specified aluminum also is of benefit in producing a fine-grained, tough, weld deposit.

Manganese and silicon are also reducing agents and form stable oxides preferentially to iron, which oxides are not as readily reduced by carbon during welding as is iron oxide. Thus these elements also reduce the evolution of carbon monoxide which leads to weld porosity. Therefore manganese and silicon, which are usually contained in commercially available steels, desirably are present in addition to the aluminum.

The preferred composition of the filler wire electrode is as follows, by weight: carbon 0.08% to 0.23%; manganese 0.75% to 2.50%; silicon 0.25% to 1.25%; aluminum 0.02% to 0.18%; and the balance substantially all iron.

It is important that the aluminum be incorporated in the filler wire electrode itself rather than in a flux or coating, so that it is transferred across the arc with the filler metal to become incorporated in the weld metal and perform its intended function. This is accomplished according to the invention by striking the arc between the end of the filler wire electrode in which the aluminum is incorporated, feeding the wire continuously toward the work as it is consumed and transferred across the arc into the molten weld pool, and shielding the arc and the molten weld pool by surrounding the same with a non-turbulent or laminar flow stream of an inert monatomic gas such as helium and/or argon to substantially completely exclude air from the arc and the molten metal on the electrode tip and on the workpiece. An example of such a shielded arc, and an apparatus for forming the same particularly suitable for use in the present invention is disclosed in Muller et al. Patent No. 2,504,868, issued April 18, 1950, assigned to applicant's assignee.

I claim:

1. A method of welding ferrous metal such as rimmed or semi-killed steel containing substantial amounts of oxygen and carbon, comprising: fusing a portion of said ferrous metal with an electric arc to form a weld pool of molten metal; feeding into said weld pool a bare ferrous wire composed principally of iron containing carbon, manganese, silicon and from 0.02% to 0.18% of aluminum as an essential active ingredient; and blanketing said arc, the consuming end of said filler wire and said weld pool with a stream of inert monatomic shielding gas to exclude air from the molten metal and prevent loss of said deoxidizer.

2. A method according to claim 1 in which said filler wire is a fully killed steel wire having the following analysis by weight: carbon 0.08% to 0.23%; manganese 0.75% to 2.50%; silicon 0.25% to 1.25%; aluminum 0.02% to 0.18%; and the remainder iron.

3. A method of welding comprising establishing an electric arc between a ferrous metal workpiece containing ferrous oxide and carbon and a bare electrode composed principally of iron containing carbon from .08% to .23%, manganese from .75% to 2.50%, silicon from .25% to 1.25%, and aluminum from .02% to .18%; blanketing said arc, the consuming end of said electrode, and the welding pool formed on said workpiece with a stream of inert monatomic shielding gas to exclude air from the molten metal; and advancing the electrode to maintain the arc as metal is transferred from the electrode to the workpiece to form a weld substantially free of porosity.

4. As an article of manufacture, a fully killed drawn steel bare wire electrode adapted to be continuously consumed by an electric arc formed between one end of the wire and a workpiece by a current fed into the electrode adjacent said end thereof, said electrode having the following analysis by weight: carbon 0.08% to 0.23%, manganese 0.75% to 2.50%, silicon 0.25% to 1.25%, aluminum 0.02% to 0.18%, and the remainder iron.

ALBERT MULLER.

REFERENCES CITED

The following references are of record in the file of this patent:

UNITED STATES PATENTS

| Number | Name | Date |
|---|---|---|
| 1,144,390 | Strohmenger | June 29, 1915 |
| 1,260,989 | Cravens | Mar. 26, 1918 |
| 1,954,296 | Keir | Apr. 10, 1934 |
| 2,496,347 | Herbst | Feb. 7, 1950 |